United States Patent
Stefanov et al.

(10) Patent No.: US 10,295,137 B2
(45) Date of Patent: May 21, 2019

(54) MOTOR VEHICLE HEADLIGHT WITH A LIGHT MODULE FEATURING A MICRO PROJECTOR

(71) Applicant: Automotive Lighting Reutlingen GmbH, Reutlingen (DE)

(72) Inventors: Emil P. Stefanov, Reutlingen (DE); Christian Buchberger, Reutlingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 15/969,221

(22) Filed: May 2, 2018

(65) Prior Publication Data

US 2018/0335191 A1 Nov. 22, 2018

(30) Foreign Application Priority Data

May 18, 2017 (DE) .......................... 10 2017 110 886

(51) Int. Cl.
| | |
|---|---|
| *F21V 5/00* | (2018.01) |
| *G02B 3/00* | (2006.01) |
| *F21S 41/16* | (2018.01) |
| *F21S 41/43* | (2018.01) |
| *F21S 41/63* | (2018.01) |

(Continued)

(52) U.S. Cl.
CPC ........... *F21S 41/265* (2018.01); *F21S 41/143* (2018.01); *F21S 41/16* (2018.01); *F21S 41/275* (2018.01); *F21S 41/43* (2018.01); *F21S 41/635* (2018.01); *F21V 5/004* (2013.01); *G02B 3/0006* (2013.01);

(Continued)

(58) Field of Classification Search
CPC ........ F21S 41/143; F21S 41/16; F21S 41/265; F21S 41/275; F21S 41/43; F21S 41/635; G02B 27/0961; G02B 3/0006
See application file for complete search history.

(56) References Cited

U.S. PATENT DOCUMENTS

2016/0265733 A1 9/2016 Bauer et al.

FOREIGN PATENT DOCUMENTS

| AT | 514967 A1 | 5/2015 |
|---|---|---|
| DE | 10039086 A1 | 2/2002 |

(Continued)

OTHER PUBLICATIONS

Search Report for German Patent Application No. 10 2017 110 886.6 dated Nov. 22, 2017.

(Continued)

*Primary Examiner* — Thomas M Sember
(74) *Attorney, Agent, or Firm* — Howard & Howard Attorneys PLLC

(57) ABSTRACT

A motor vehicle headlight includes a light module, having a light source, a primary optics that collects light and micro projectors, of which each one comprises one respective input lens, one respective output lens and an aperture that is arranged between the input lens and the output lens. The input lens, the aperture and the output lens feature one width and one height. The primary optics, the input lens, the aperture and the output lens of one respective micro projector are arranged in such a way, that the light from the light source that emits from the primary optics illuminates the input lens, and the light of the light source that emits from the input lens illuminates the output lens. The headlight includes micro projectors, whose widths (b) are different and whose heights (h) are different.

10 Claims, 12 Drawing Sheets

(51) Int. Cl.
*G02B 27/09* (2006.01)
*F21S 41/143* (2018.01)
*F21S 41/265* (2018.01)
*F21S 41/275* (2018.01)
*F21Y 115/10* (2016.01)
*F21Y 101/00* (2016.01)

(52) U.S. Cl.
CPC ...... *G02B 27/0961* (2013.01); *F21Y 2101/00* (2013.01); *F21Y 2115/10* (2016.08)

(56) References Cited

FOREIGN PATENT DOCUMENTS

| | | |
|---|---|---|
| DE | 102009053581 B3 | 3/2011 |
| DE | 102015107644 A1 | 11/2016 |
| EP | 0738903 A1 | 10/1996 |
| EP | 0999407 A2 | 5/2000 |
| WO | 2015058227 A1 | 4/2015 |

OTHER PUBLICATIONS

Communication for European Patent Application No. 18166107.5 dated Oct. 12, 2018.

MOTOR VEHICLE HEADLIGHT WITH A LIGHT MODULE FEATURING A MICRO PROJECTOR

CROSS-REFERENCE TO RELATED APPLICATIONS

The present application claims priority to and all the benefits of German Patent Application No. 10 2017 110 886.6, filed on May 18, 2017, which is hereby expressly incorporated herein by reference in its entirety.

BACKGROUND OF THE INVENTION

1. Field of the Invention

The present invention refers to a motor vehicle headlight.

2. Description of the Related Art

A motor vehicle headlight of the type usually known in the art is disclosed in WO 2015/058227 A1 and comprises a light module, which features a light source, a primary optics that is collecting the light of the light source and a plurality of micro projectors, wherein each one comprises one respective input lens, one respective output lens and an aperture that is arranged between the input lens and the output lens. In accordance with the intended use of the motor vehicle headlight, the input lens, the aperture and the output lens feature a width that extends parallel towards a horizontal direction and a height that extends parallel towards a vertical direction. The primary optics, the input lens, the aperture and the output lens of one respective micro projector are arranged in such a way, that the light from the light source that emits from the primary optics illuminates the input lens, and the light of the light source that emits from the input lens illuminates the output lens.

Conventional projection modules for motor vehicle headlights feature an overall depth of the optics that is ranging between 75 mm and more than 120 mm. Halogen and xenon headlights are included in this category. While in use, the light sources of these two categories are heating up to several hundred degrees. In their vicinity, temperatures reach a level that is not compatible for the use of fine structured plastic optics.

Only within the last 10 to 15 years, it was possible to use plastic optics in the vicinity of the light source by using colder light sources, such as e.g. LEDs or laser diodes, which can tolerate operating temperatures of up to 150° C. This made the development of more complex optical approaches, such as full LED and/or Matrix LED headlights, possible. In the beginning of their development, such approaches were characterized by discretely constructed light source modules. A matrix headlight with a structured silicone optics and an imaging optics is known from DE 10 2009 053 581 A1.

With these approaches, it was not possible to utilize all possibilities of a miniaturization, since comparatively large primary optics as well as individual large single-beam-path projection lenses were still used to form matrix light distributions. With regard to reducing the size of the primary optics, there is a limit due to construction reasons. The very complex optical fiber based primary optics are produced in a plastic injection molding procedure, which requires correspondingly fine molding cavities. For complex silicone light conductors, the size reduction is getting increasingly elaborate and there is ultimately no limit to the costs. Such headlight modules feature a depth of the optics that is also ranging between 75 mm and more than 120 mm.

It is a general trend that the available construction space for motor vehicle headlights is getting more and more limited in motor vehicles, which are getting more and more complex. This results in demands for a miniaturizing of motor vehicle headlights. This has resulted in various approaches for solutions. One approach for a solution is based on the idea of a slide or film projector. The light distribution is generated by means of a mask within the focal surface of a suitable projection lens. This can either be a filter (slide, LCD) or also a finely structured mirror array (digital light processing DLP), which is illuminated and then generates a dynamic light distribution by means of a high-frequency tilting of individual micro mirrors, which in turn is also projected via a projection lens. It is correspondingly also possible to project a finely structured, integrated LED light source, that can be controlled on a pixel level, by means of a projection lens, so that its light source distribution, which can be adapted in a finely structured manner, is projected onto the roadway.

In all these cases, one respective imaging optics is used. A reduction of the optics would require that the mirror or LED arrays are correspondingly reduced in size. Such an approach is currently limited due to technical reasons, so that the size reduction of such headlights with only one optical beam path cannot be sufficiently promoted. As a result, the reduction of the construction depth of such headlights is also limited to values ranging between approximately 60 mm and more than 100 mm.

Other approaches for a solution do not intend to structure the primary optics, but rather aim at structuring the imaging secondary optics. Such approaches are pursued in the EP 999 407 and in the AT 514 967. In the subject-matter of the AT 514 967, the primary optics collimates a wide-angled light source distribution. These light beams pass through decoupling optics in a parallel or almost parallel manner towards each other. Each input coupler focusses a light beam that is illuminating it, and generates a cross-section light distribution, which serves as a virtual light source for a micro projector that follows downstream in the beam path.

In the before-mentioned WO2015/058227A1, a micro projector is placed downstream of each input coupler, or of each focused light beam, and the respective light beam enters into this micro projector. The input coupler carries out the light distribution and forms each of the light distributions of the virtual light sources, which its assigned micro projector then projects onto the roadway. At the locations of the virtual light sources, micro apertures are placed, in order to generate desired cut-off lines (HDG).

Hereby each light distribution, which is to be projected, and each aperture is so small that, while the image size is maintained, i.e. with an adaption of the magnification scale, a significant shortening of the focal length and thus of the construction depth can be achieved for such micro projectors. This means a size reduction by a factor of approximately ⅓ to ⅛ when compared to a conventional projector. Significant for the size reduction are the size of the light source and its light density. All projected light distributions are superimposed on the roadway to an overall light distribution.

According to WO2015/058227 A1, light beams that are superimposed to an overall light distribution are cropped by masks that vary from light beam to light beam (see there in FIGS. 3 and 3b), in order to produce an overall light distribution with a desired shape and brightness distribution (there in FIG. 3a). In fact, several unnecessary cut-off lines are hereby projected. As it can be seen there, the differently shaped partial light distributions are superimposed to one overall light distribution. Not every partial light distribution features the same cut-off line. For example, LV2 includes a so-called 15°-ascent, while LV1, LV3, LV4, LV5 (there in FIG. 3b) feature a horizontal cut-off line.

If it is assumed that each mask/aperture in FIG. 3 of the WO2015/058227A1 is illuminated with the same intensity, it is directly obvious that a lot of light is shielded off, which entails several disadvantages: In order to achieve a predetermined brightness on the roadway, several light sources need to be used, which is expensive. Many light sources also produce comparatively much heat, which requires large and heavy cooling elements. Due to the superimposition of wide basic light distributions (see in particular LV1) with one low-beam spot (see LV2), it can also occur that the greatest brightness is achieved unnecessarily far below the horizon, which limits the range in a negative way.

The light distribution of a low-beam spot with a rule-consistent cut-off line extends in horizontal direction e.g. only until +/−20° H and in vertical direction e.g. only between +0.43° V and −4° V. In order to compile a complete low-beam light distribution, which can comprise portions until e.g. +/−40° horizontal and up to −10° vertical, an additional basic light distribution is necessary. Basic light modules illuminate in horizontal direction e.g. +/−40°. Basic light modules hereby often generate a straight horizontal cut-off line which may in some sections not go higher than −0.57° below the horizon on the left side in right-hand traffic. Due to its horizontal course, it also does not reach higher on the right side. When such a basic light distribution is integrated into a low-beam light distribution, in which high intensities are demanded above the horizon on the left side in horizontal direction upwards of −10° and on the right side in the horizontal direction upwards of about +1.5°, the cut-off line of the basic light distribution remains visible on the left and in particular on the right and distracts the overall appearance. Additionally, the low-beam range only reaches suboptimal values, since the required allowed intensity maximum (less than 43.750 cd) may possibly be found below the horizon, at the transition to the basic light distribution.

Based on the WO2015/058227 A1, which already fulfills the demand for a reduction of construction space, the inventors have set themselves the goal to provide a motor vehicle headlight, which—while not requiring more construction space —works more efficiently than the known headlight, produces a homogeneous, colorless low-beam light distribution which features an angle range of more than +/−40° in horizontal direction and an angle range of +0.57°/−10° in vertical direction for light intensities of at least 250 cd and whose light intensity increases towards the center, or towards the optical axis, in the case of the low-beam light towards the maximum allowed 43750 cd, without the appearance of sharp brightness differences within the light distribution. For a high-beam light (without an aperture), simpler requirements apply without a cut-off line and with a higher maximum. A homogeneous light distribution is thereby understood to be a light distribution in which, apart from the outer edges, no sharp brightness differences and no chromatic aberrations appear.

SUMMARY OF THE INVENTION

This objective is achieved by a motor vehicle headlight that includes micro projectors, whose widths are different and whose heights are different.

Due to the different widths and heights, the micro projectors feature differently-sized cross-sections. These cross-sections form the input pupils of the input lenses. As a result, light beams with different widths and heights are generated, without shielding off more light than what is necessary for the generation of a rule-consistent standard cut-off line. Denser light distribution curves (i.e. ISO-lines of equal intensity at a measuring wall) and thus with a higher concentration in one center (hot spot) can be generated with projection modules with smaller cross-sections.

While having the same curvature of the optical surface of the input lenses, the light cone cross-sections, which emit via the output lenses, feature even lower expansions as the input lenses are getting smaller.

Instead of using additionally modified apertures to crop the light cone cross-sections not only for the shaping of the required HDG's, but even beyond that, micro projectors of differently-sized cross-sections are suggested. The suggested cross-sections are the input pupils of the input coupler lenses of each projector. In this way, ideally no additional light portions are shielded off, except those light portions that need to be shielded off in order to produce the standard cut-off line. Courses, discontinuations and concentrations of the light distributions are influenced by the curvature conditions at the input coupler lens and by the remaining divergence of the primary optics, or by the aperture angle of the light beam that emits from the primary optics.

While maintaining the same curvature of the light-refracting surfaces of the input lens, the expansion of the light beam cross-section, that is transverse to the optical axis, reduces, as the input pupils get smaller. Subsequently the light cone cross-sections, which are projected from the output lenses onto the roadway, also get smaller. As a result, the light distributions that are generated on the roadway in this way, feature expansions that can be predetermined in a constructive manner by the widths and heights of the micro projectors and thus without any shielding off.

Denser light distribution curves (ISO-lines of equal intensity in the light distribution) and higher light intensities in the center of the light distributions (hot spots) can be achieved with projection modules that feature smaller cross-sections.

The smaller input pupils or micro projector cross-sections make it possible to use a larger number of micro projectors within the same construction space. Correspondingly, this also results in a higher amount of denser light distributions that are superimposed. In this way, it is possible to achieve a reduction of the numeric aperture of each micro projector, and the chromatic aberrations are reduced. The illuminated aperture angle is getting smaller and the averaged light intensity within the headlight beam, or the illumination intensity on the roadway, is multiplied in accordance with the increased number of micro projectors.

By means of this solution, no light portions are unnecessarily shielded off. The light transmission efficiency is basically maintained, independent of the fact whether a dense and intensive light distribution (hot spot) is generated or a wider distribution of a lower intensity (wide spread). In contrast to the WO 2015/058227 A1, the light transmission efficiency is hereby not dependent on the fact whether a dense and intensive light distribution (hot spot) is generated or a wider distribution of a lower intensity (wide spread). The light transmission efficiency remains on the usual level of a conventional projection module.

The invention hereby uses micro projectors, which facilitate the implementation of particularly short headlight modules by a plurality of micro projectors that are arranged adjacent and on top of each other like in a matrix.

In addition to the advantage of a massive reduction of construction space, this approach enables the generating of a most homogeneous color-neutral overall light distribution with a sharp cut-off line and less distinctive chromatic aberrations.

In one embodiment, the focal points of the input lens of at least one of the micro projectors are located within one expansion direction of the light that is issuing from the light source behind the aperture of the at least one micro projector. The focal points of the input lens are hereby preferably always positioned behind the aperture that is imaging the cut-off line in the direction of the projecting lens, both in horizontal direction as well as in vertical direction.

This facilitates a more flexible shaping of the light distribution that is to be projected at the location of the edge of the aperture which is to image the cut-off line and reduces crosstalk to the imaging lenses of the adjacent micro projectors.

In one embodiment, the input lenses of at least two micro projectors are differentiated by the curvatures of their light input surfaces and/or by the curvatures of their light output surfaces.

This furthermore results in a greater scope of options in the design of the light module, since courses, discontinuations and concentrations of the light distributions are influenced by the curvature conditions at the input coupler lens and by the remaining divergence of the primary optics.

Another advantageous embodiment is characterized in that the light output surfaces of the output lenses of at least two of the micro projectors feature the same curvature.

This results in identical optical base surfaces for the imaging output lenses. As a result, the output lenses project the apertures, or the light distribution that exists at the location of the aperture, ideally as same-sized images onto the roadway.

However, it is also possible that the apertures are scaled (differently sized but with the same proportions). In such a case, the output lenses, their base surfaces and focal lengths would differ in that by an adaption of the image ratio, same-sized aperture images are projected onto the roadway. In the situation of a high-beam light, the aperture would not be used, but the remaining requirements are maintained so that the local light distribution at the missing aperture position is projected via the output lens onto the road.

In one embodiment, the motor vehicle headlight comprises first micro projectors that feature a first width and a first height, second micro projectors that feature a second width and a second height, and third micro projectors that feature a third width and a third height.

Such a headlight is suitable to generate various partial light distributions, in which the brightness is distributed in a differently wide range, so that it is possible to produce overlapping light distributions with wide portions (wide spread) and with far ranging portions (hot spot). Thus, the overall light distribution of the headlight covers the entire required angle range of a rule-consistent light distribution. The overall light distribution is being defined by the "mixture ratio" of the micro projector cross-section types. To accomplish this, the headlight may comprise a hybrid light module, which comprises different types of micro projectors, or it may comprise several light modules, in which each module only features one type of micro projector, wherein the different light modules comprise different types of micro projectors.

In another advantageous embodiment, the motor vehicle headlight comprises several light modules. In another embodiment, the input lenses of at least two micro projectors are differentiated by the curvatures of their light input surfaces and/or by the curvatures of their light output surfaces.

In another embodiment, a first light module of the several light modules only comprises first micro projectors, whose widths are equal and whose heights are equal, and that a second one of the several light modules only comprises second micro projectors, whose widths are equal and whose heights are equal, wherein the widths of the first micro projectors are different from the widths of the second micro projectors and wherein the heights of the first micro projectors are different from the heights of the second micro projectors.

In one embodiment, a light module comprises micro projectors, whose widths are different and whose heights are different.

Such a hybrid light module is suitable to generate various partial light distributions with only one light source and one primary optics, in which the brightness is distributed to a differently wide range, so that it is possible to produce overlapping light distributions with wide portions (wide spread) and with far ranging portions (hot spot). The overall light distribution of such a hybrid light module thus covers the entire required angle range of a rule-consistent light distribution. The overall light distribution is being defined by the "mixture ratio" of the micro projector cross-section types and can be finely or continuously dimmed via the power supply of the light source. Its contrast ratios are hereby ideally maintained.

In one embodiment, a sum of the widths of adjacently arranged micro projectors of one light module may be less than 30 mm and that a sum of the heights of micro projectors of one light module that are arranged on top of each other may be less than 30 mm.

In another embodiment, the widths of the micro projectors may be less than 6 mm, the heights of the micro projectors may be less than 4 mm and the depths of each respective lens of the micro projectors may be less than 6 mm.

In one embodiment, the motor vehicle headlight comprises a plurality of light modules, wherein the light-collecting primary optics of at least two of the light modules bundle the light entering into them to different degrees.

In this way, it is possible to additionally influence the light distribution.

It is understood that the previously mentioned characteristics as well as those that are still to be explained in the following can not only be used in the respectively mentioned combinations, but also in other combinations or individually, without leaving the scope of the present invention. Thus, other objects, features and advantages of the present invention will be readily appreciated as the same becomes better understood after reading the subsequent description taken in connection with the accompanying drawings.

BRIEF DESCRIPTION OF THE DRAWINGS

Embodiments of the invention are depicted in the drawings and are further explained in the following description. Hereby the same reference signs in the various figures refer to respectively same elements or to elements that can at least be compared based on their function.

DETAILED DESCRIPTION OF THE INVENTION

Figure 1:
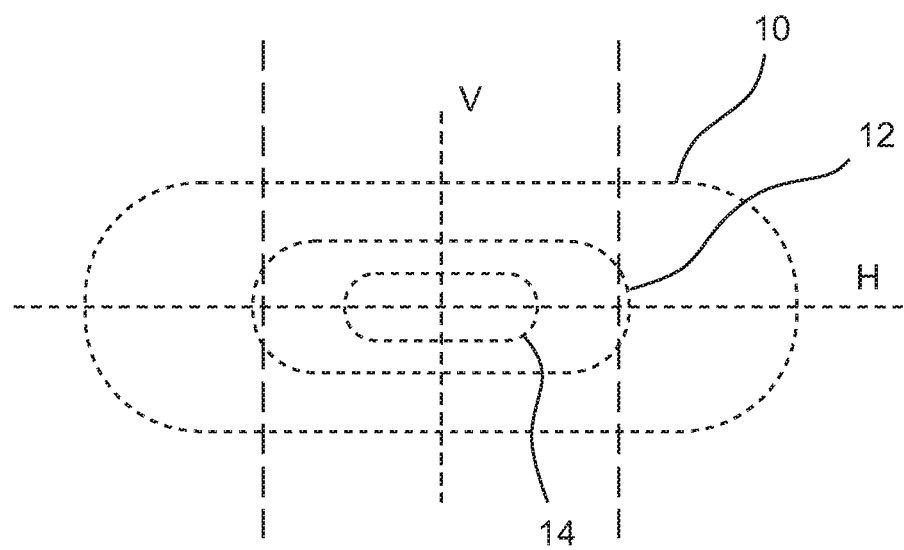
FIG. 1 shows a superimposition of three high-beam light distributions.

FIG. 1 shows purely qualitatively in detail a superimposition of three high-beam light distributions 10, 12, 14, as they appear on a perpendicular screen in front of a headlight, along with the indication of a vertical direction V and the indication of a horizontal direction H. The widest one of the three light distributions will also be referred to in the following as extra wide spread light distribution 10. The next less wide high-beam light distribution will also be referred to in the following as wide spread high-beam light distribution 12, and the narrowest one of the three light distributions will also be referred to in the following as hot spot light distribution 14.

Figure 2:
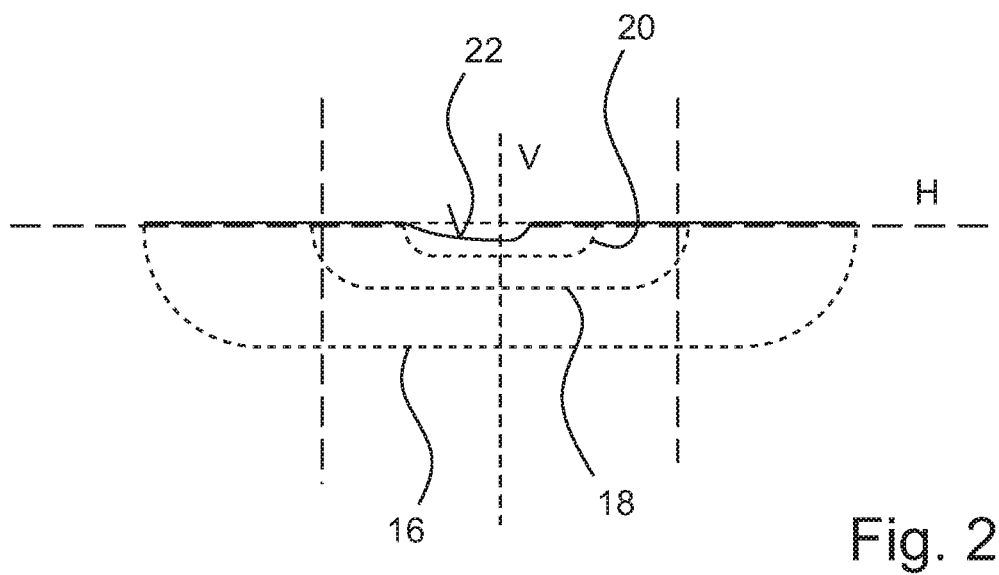
FIG. 2 shows herewith corresponding low-beam light distributions.

FIG. 2 shows the corresponding low-beam light distribution 16, 18, 20 with a cut-off line 22 that is congruent in the overlapping area for all three low-beam light distributions 16, 18, 20. The widest one of the three light distributions will also be referred to in the following as extra wide spread low-beam light distribution 16. The next less wide light distribution will also be referred to in the following as wide spread low-beam light distribution 18, and the narrowest one of the three light distributions will also be referred to in the following as hot spot low-beam light distribution 20.

Figure 3:
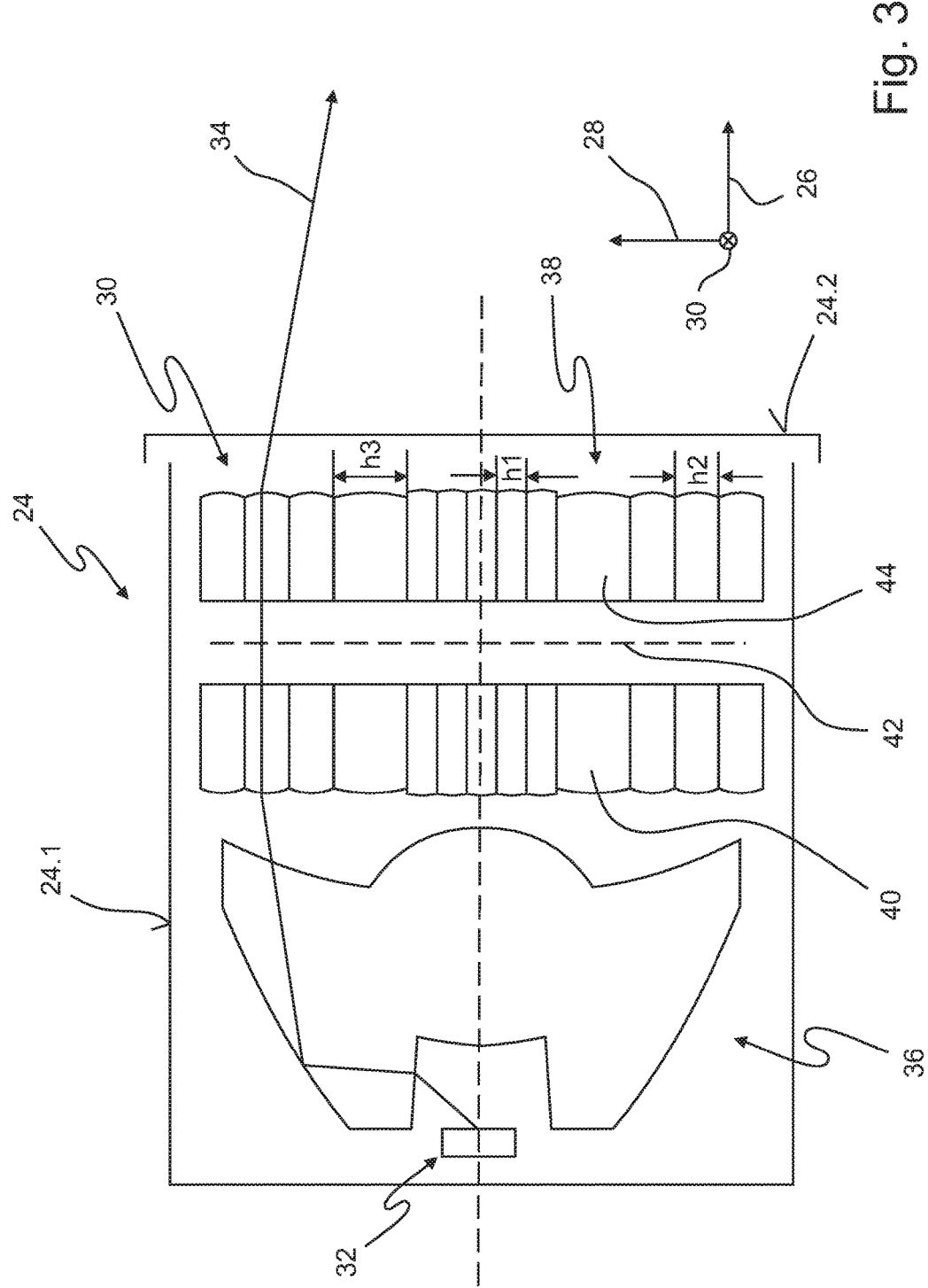
FIG. 3 shows an embodiment of the motor vehicle headlight in accordance with the invention.

FIG. 3 depicts an embodiment of the motor vehicle headlight 24 according to the invention, in a sideway section. When the headlight 24 is used in a motor vehicle according to the intended purpose, the section plane is spanned from the direction 26 of a longitudinal axis and from the direction 28 of a vertical axis of the motor vehicle. The direction 30 of a transversal axis of the motor vehicle runs perpendicular to this section plane. Headlight 24 features one light module 30, which comprises one light source 32, one primary optics 36 that bundles and parallelizes the light 34 from light source 32 as well as a plurality of micro projectors 38. Light source 32 is a semiconductor light source, preferably a light diode or laser diode, or an array comprising several of such diodes. The light module is arranged in a housing 24.1 of headlight 24. A light aperture of the headlight is covered by a transparent cover screen 24.2.

Micro projectors 38 vary partially in their height in parallel direction with regards to the vertical axis 28 in FIG. 1. The first micro projectors feature a small height h1. These micro projectors are used to generate a hot spot light distribution. The second micro projectors feature a medium height h2. These micro projectors are used to generate a wide spread light distribution. The third micro projectors feature a large height h3. These micro projectors are used to generate an extra wide spread light distribution. The terms small, medium and large are hereby used for the qualitative distinction of the three differently sized micro projectors and should therefore not be understood as limitations to certain quantitative values.

Each micro projector 38 comprises one input lens 40, one aperture 42 (applies to low-beam micro projectors) and one output lens 44. The end faces of the input and output coupling surfaces have the same distances from the aperture area, for the hot spot as well as the wide spread and also the extra wide spread micro projectors. As a result, the magnifying factors of these micro projectors are also the same. Thus, the micro projectors produce unevenly large images in the far field. A brightness distribution in the far field results from the superimposition of differently large images. If the distances would not be equal, but would rather be different, this would require a scaling of the apertures. Larger distances increase the focal length and reduce the aperture angle of the output light cone.

In the motor vehicle headlight of the present invention, differently sized light beam cross-sections, which are projected into the far field, are produced by different sizes of the input pupils of the micro projectors. The apertures 42 are only used to shape the cut-off line. Narrow light distributions in the far field are produced by narrow input pupils (e.g. hot spot). High intensities are produced by a superimposition of several narrow light distributions, i.e. by an overlapping of the contributions of comparatively many micro projectors. Wide light distributions in the far field are produced by wide input pupils (e.g. wide spread, extra wide spread). Lower intensities are produced by an overlapping of the contributions of few micro projectors.

Figure 4A:
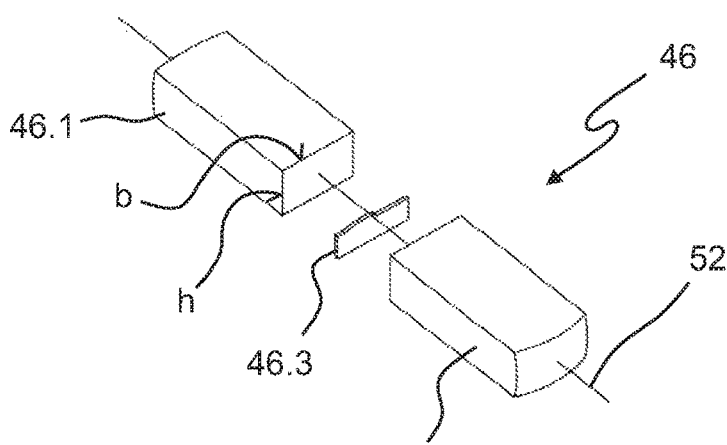
FIGS. 4a-4d are perspective views of the micro projectors of the present invention.
Figure 4B:
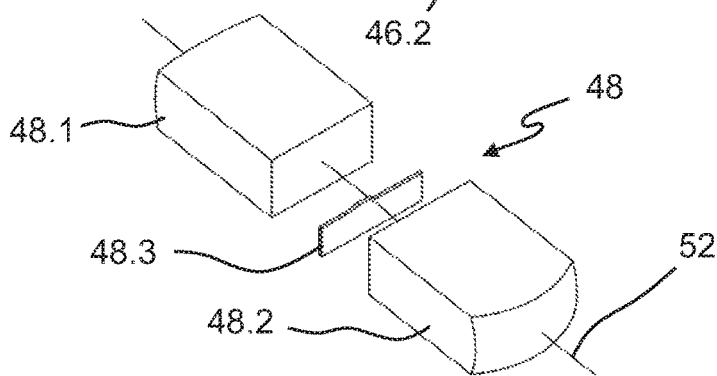
Figure 4C:
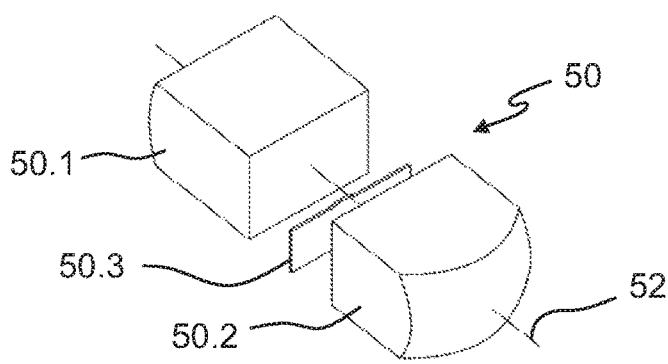
Figure 4D:
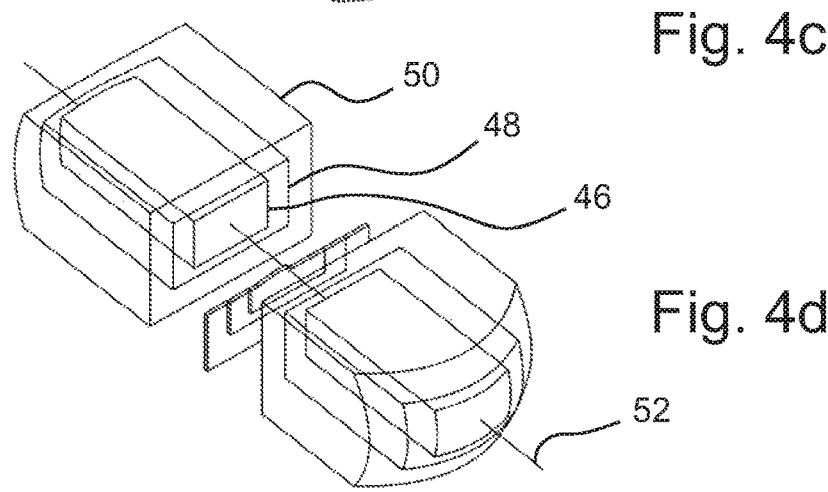

FIGS. 4a-4d show the respective micro projectors in a perspective depiction in the same scale and in an imagined superimposition for a comparison of the sizes. FIG. 4a hereby depicts a first micro projector 46, FIG. 4b a second micro projector 48, FIG. 4c a third micro projector 50, and FIG. 4d depicts the imagined superimposition of the three micro projectors 46, 48, 50. Each one of the FIGS. 4a to 4d also depicts an optical axis 52. When the headlight is used in according to the intended purpose, the optical axis 52 runs in the direction of the longitudinal axis of the motor vehicle.

Each one of the micro projectors comprises an input lens 46.1, 48.1, 50.1, an output lens 46.2, 48.2, 50.2 and an aperture 46.3, 48.3, 50.3 that is arranged between the input lens of the output lens. When the motor vehicle headlight 10 is used in according to the intended purpose, the input lenses and the apertures feature a respective width b that is extending parallel towards a horizontal direction and a height h that is extending parallel towards the vertical direction.

The same applies for the output lenses. Each output lens of a micro projector preferably features the same width b and the same height h as the corresponding input lens of the micro projector. The primary optics and the input lens, the aperture and the output lens of one respective micro projector are arranged in such a way, that the light from the light source that emits from the primary optics illuminates the input lens, and the light that emits from the input lens illuminates the output lens. The micro projectors are characterized in that their widths are different and that their heights are different.

Figure 5:
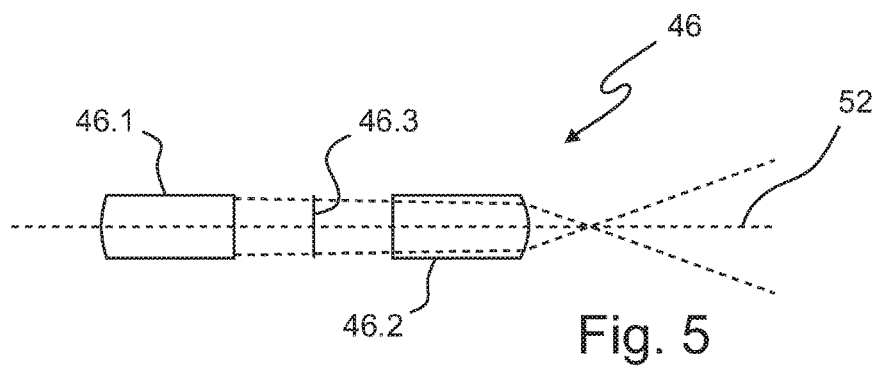
FIG. 5 is a horizontal section of one individual single (hot spot) micro projector.
Figure 6:
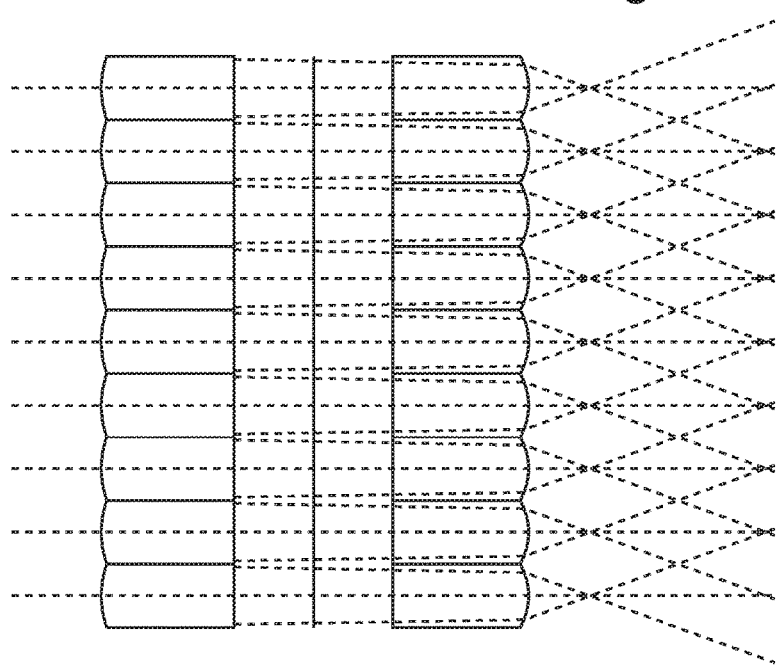
FIG. 6 is a horizontal section of one row of first micro projectors along with idealized light-beam courses.
Figure 7:
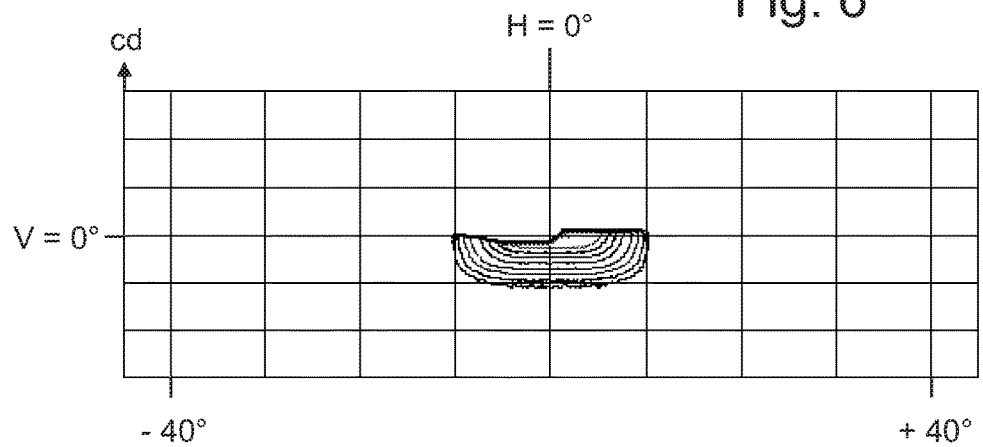
FIG. 7 depicts ISO-lines of equal intensity in a hot spot low-beam light distribution that was generated by one of the several first micro projectors.

FIG. 5 depicts a horizontal section of one individual first (hot spot) micro projector 46 and FIG. 6 depicts a horizontal section of one row of first micro projectors 46 along with idealized light-beam courses. FIG. 7 depicts ISO-lines of equal intensity in a hot spot low-beam light distribution that was generated by one of the several first micro projectors. These are characterized by a sharp upward cut-off line and a gentle fading out towards the sides with a gradual decrease of the brightness. Examples of light intensities are provided on the right abscissa in candela (cd).

Due to their small dimensions, the local shifts in the superimposition for an overall light distribution curves on the roadway are found in the same scale as the individual micro projectors. Thus, these are found within a millimeter range and are significantly smaller than the local cross-sectional expansion of their light cones on the roadway. Such a small local shift exerts almost no influence on the sharpness of the cut-off line and may at best only contribute to an improved color mixing, or homogenization of the overall light distribution curve.

Figure 8:
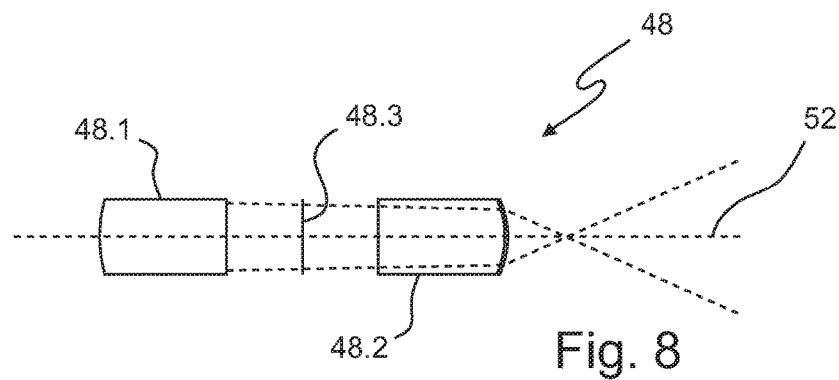
FIG. 8 is a horizontal section of one individual second (wide spread) micro projector.
Figure 9:
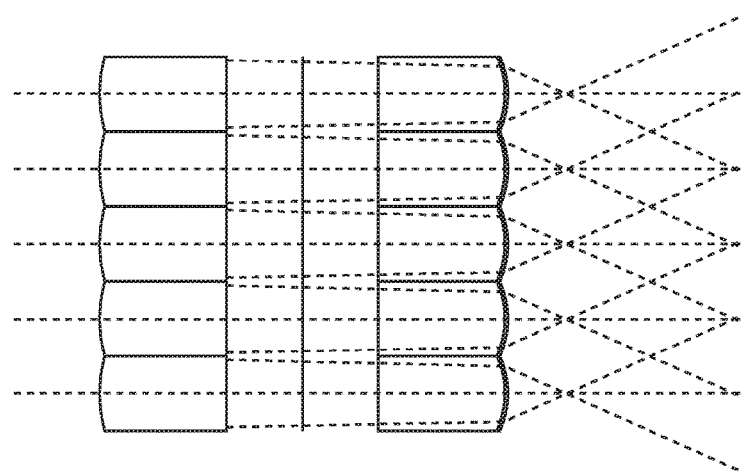
FIG. 9 is a horizontal section of one row of second micro projectors along with idealized light-beam courses.

FIG. 8 depicts a horizontal section of one individual second (wide spread) micro projector 48 and FIG. 9 depicts a horizontal section of one row of second micro projectors along with idealized light-beam courses.

Figure 10:
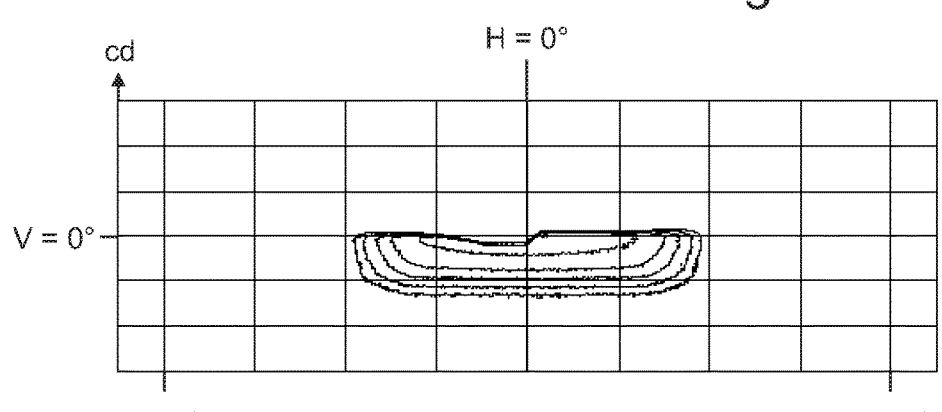
FIG. 10 shows ISO-lines of equal intensity in a wide spread low-beam light distribution that was generated by one of the several second micro projectors.

FIG. 10 depicts ISO-lines of equal intensity in a wide spread low-beam light distribution that was generated by one of several second micro projectors. These are characterized by a sharp upward cut-off line and a gentle fading out towards the sides with a gradual decrease of the brightness. Examples of light intensities are provided on the right abscissa in candela (cd).

The larger cross-section profile (input pupil) is responsible for the coverage of a larger output coupling angle. The amount of wide spread micro projectors is smaller when compared to the amount of hot spot micro projectors within a comparable construction space. Therefore, although the aperture projections are identical in the course of the cut-off line on the roadway, yet overall, they are wider and thus paler (lower light intensity) in their horizontal and vertical expansion. When compared, the light distribution that was generated by the wide spread micro projectors thus features a quantitatively weaker maximum at the same location, at which also the maximum of the hot spot light distribution is located. Towards the sides, there is a gentle fading out.

Figure 11:
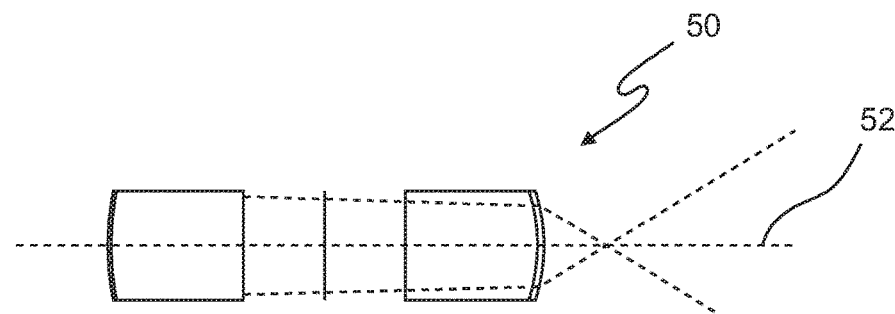
FIG. 11 is a horizontal section of one individual third (extra wide spread) micro projector.
Figure 12:
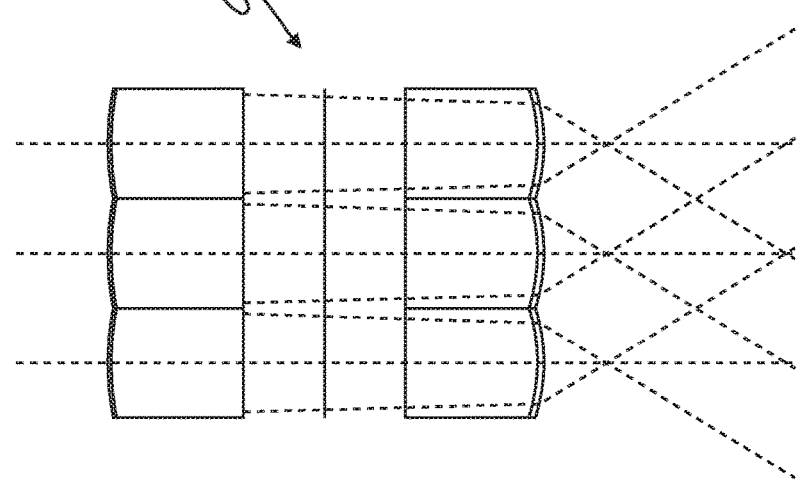
FIG. 12 is a horizontal section of one row of third micro projectors along with idealized light-beam courses.

FIG. 11 depicts a horizontal section of one individual third (extra wide spread) micro projector 50 and FIG. 12 depicts a horizontal section of one row of third micro projectors 50 along with idealized light-beam courses.

Figure 13:
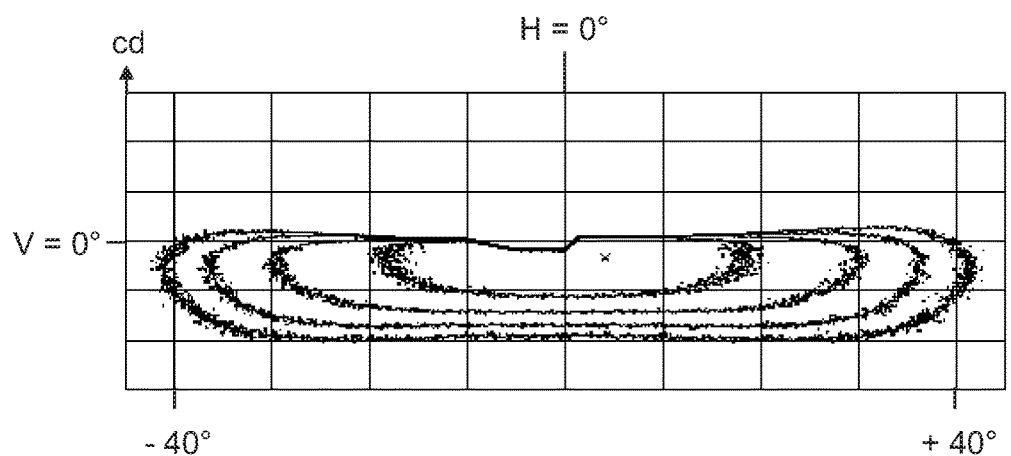
FIG. 13 shows ISO-lines of equal intensity in an extra wide spread low-beam light distribution that was generated by one of the several third micro projectors.

FIG. 13 depicts ISO-lines of equal intensity in an extra wide spread low-beam light distribution that was generated by one of the several third micro projectors. These are characterized by a sharp upward cut-off line and a gentle fading out towards the sides with a gradual decrease of the brightness. Examples of light intensities are provided on the right abscissa in candela (cd). It applies in this case as well, that the cut-off line of the hot spot, wide spread and extra wide spread light distributions feature an identical course in the area of their superimposition. The respective aperture edges are projected, possibly also magnified differently, as same-sized images, even if differently wide light distributions and cut-off lines are generated by differently narrow beam paths. With the same focal length of the imaging micro lenses, the aperture edges are also formed (scaled) in the same scale, i.e. all micro projectors have identical imaging ratios.

In one embodiment, the optical components of the micro projectors feature the following widths B, heights H and depths T and further dimensions:

Hot spot lenses: 2.3 mm×1.4 mm×5.0 mm (B×H×T)
Wide spread lenses: 3.6 mm×2.1 mm×5.0 mm (B×H×T)
Extra wide spread lenses: 5.0 mm×3.6 mm×5.0 mm (B×H×T)
Lens distance: 4.0 mm
Aperture thickness: 0.1 mm, placed centered between input lens and output lens
Focal length of the input lenses: »7.0 mm
Shape of the optical surfaces and input lenses: (biconical, toric, freeform)
Focal length of the output lenses: approx. 7.0 mm
Shape of the optical surfaces and output lenses: (spherical, aspherical)

The optical axes of the imaging micro projector lenses (spherical, aspherical) determine the optical axes of the respective micro projectors and are arranged parallel or almost parallel towards each other. The narrower the individual micro projectors are, the smaller the aperture angles of the individual micro beams are, despite short focal lengths. This particularly applies to the hot spot micro projectors. In this way, less color dispersion occurs at the lens edges.

As it can be derived from FIGS. 5, 8, 11, the focal points of the input lenses of the micro projectors are located downstream of the luminous flux of the aperture of the respective micro projector.

The light output surfaces of the output lenses of the micro projectors are preferably curved to the same degree.

Figure 14A:
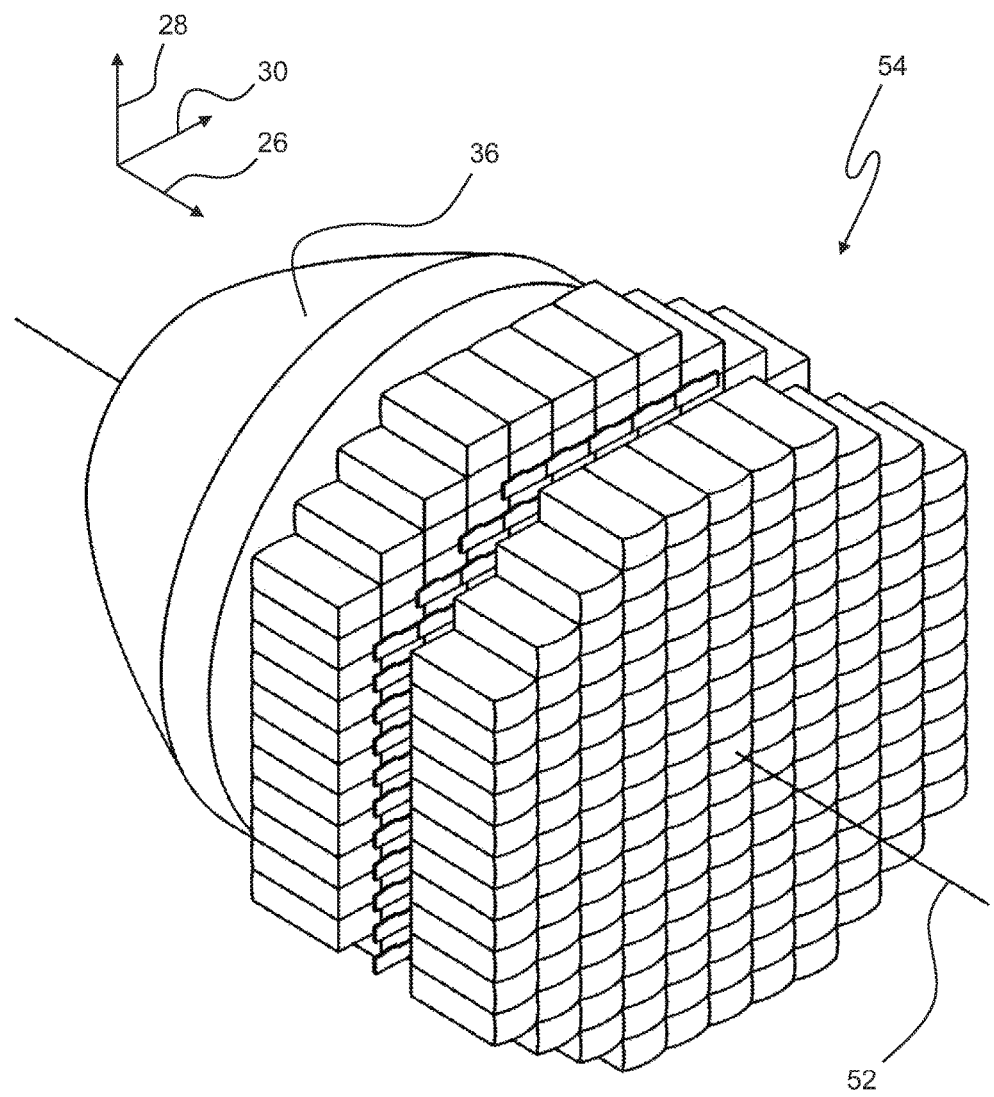
FIGS. 14a-14d show different light modules and an ensemble of these light modules.
Figure 14B:
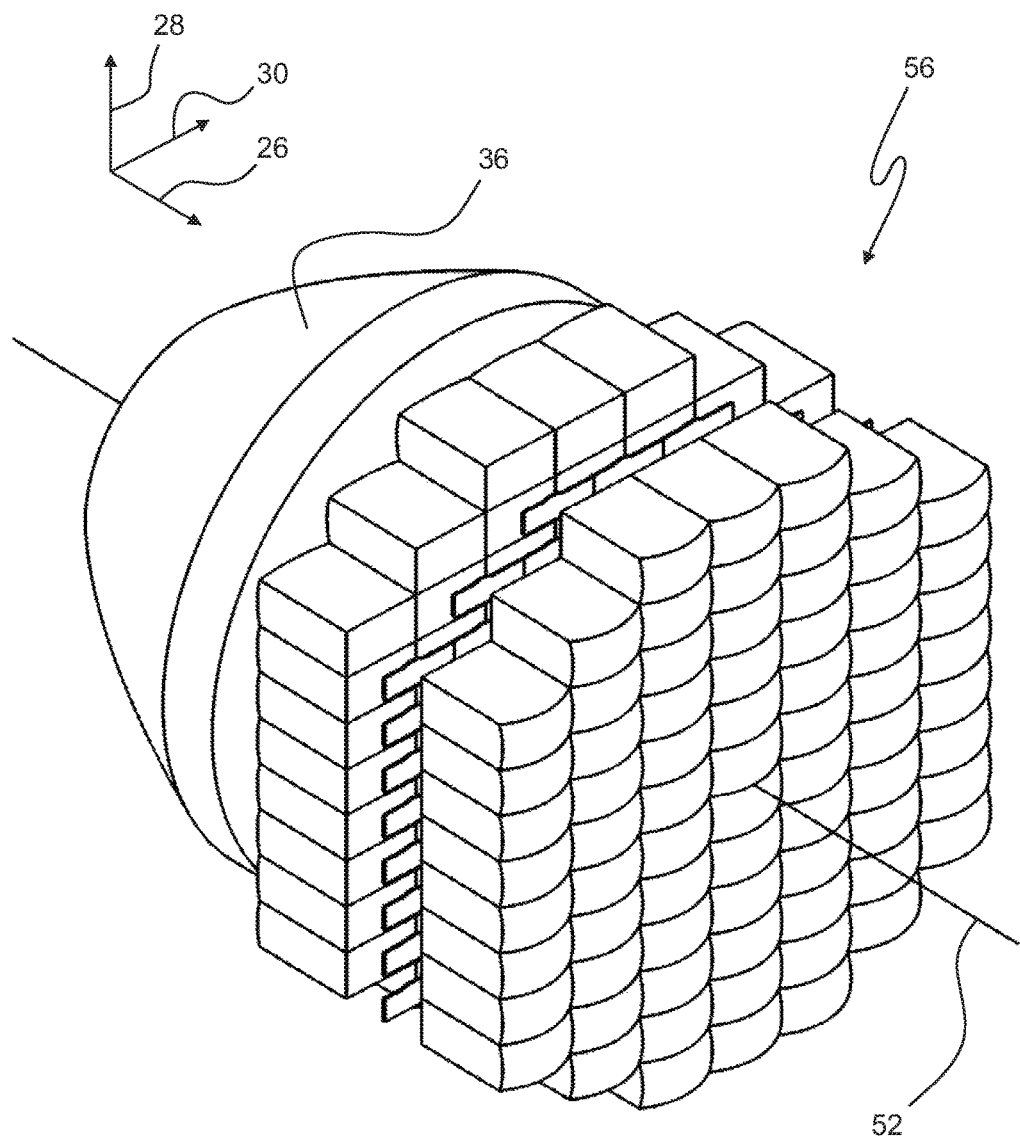
Figure 14C:
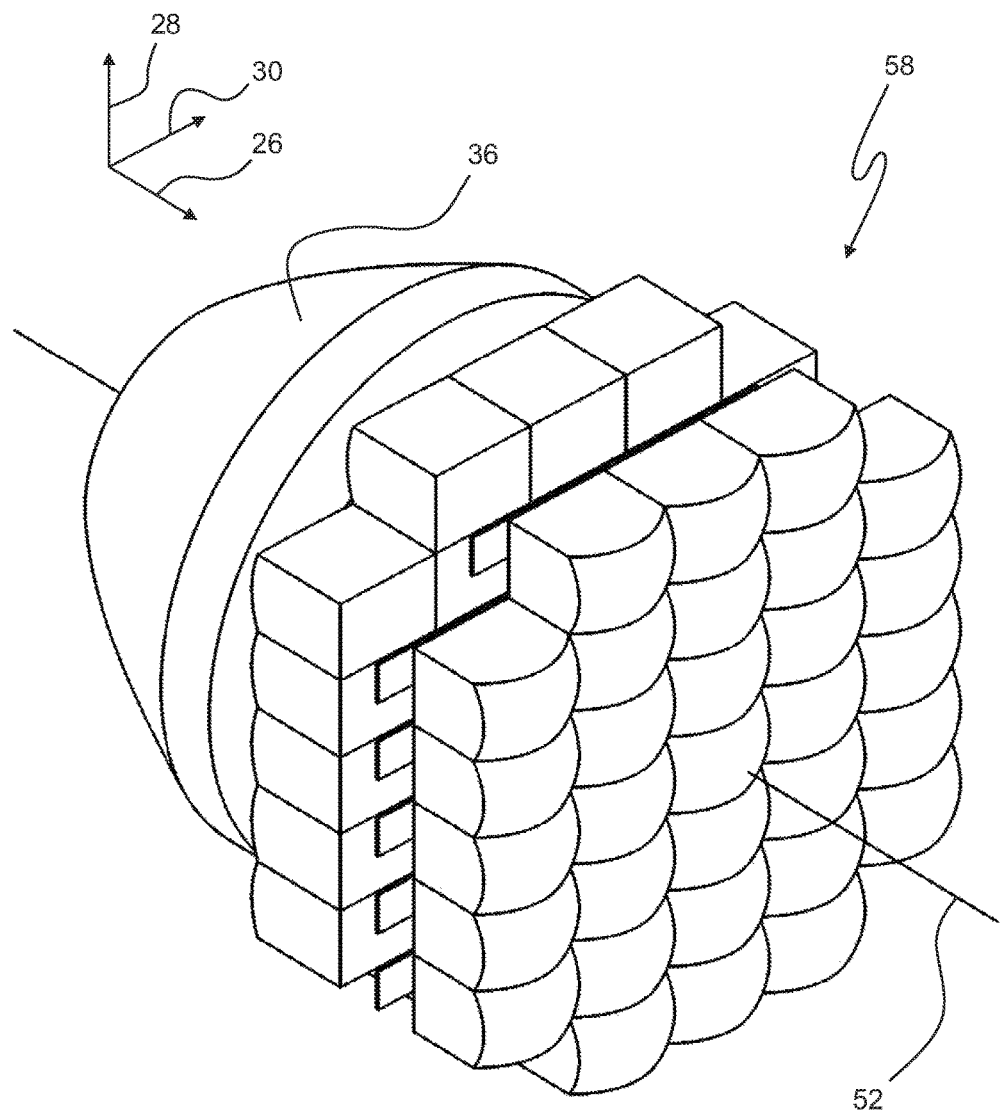

FIG. 14a depicts a first light module 54, which only comprises first micro projectors. FIG. 14b depicts a second light module 56, which only comprises second micro projectors and FIG. 14c depicts a third light module 58, which only comprises third micro projectors.

The first light module 54 only comprises first micro projectors, whose first widths are equal and whose first heights are equal. The second light module 56 only comprises second micro projectors, whose second widths are equal and whose second heights are equal. The third light module 58 only comprises third micro projectors, whose third widths are equal and whose third heights are equal. The heights are respectively parallel towards the vertical axis 28. The widths are respectively parallel towards the transverse axis 30.

The first widths of the first micro projectors differ from the second widths of the second micro projectors and from the third widths of the third micro projectors. The first heights of the first micro projectors differ from the second heights of the second micro projectors and from the third heights of the third micro projectors.

In this way, e.g., three module types are created: hot spot, wide spread and extra wide spread. Each module is made up of a collimating primary optics, an array of input lenses, an array of apertures and an array of output lenses.

Each module type features the dimensions of e.g. 25 mm×25 mm×30 mm (height H×width B×depth T). It is characterizing that the micro projector cross-sections for hot spot, wide spread and extra wide spread are different in size. The higher light intensity in the hot spot is generated by micro projectors, whose cross-section is smaller than the cross-section of the wide spread micro projectors. The cross-sections of the wide spread micro projectors are smaller than the cross-sections of the extra wide spread micro projectors. The imaging quality is best near the common optical axis 52 up to approximately +/−10° towards the sides. Starting from +/−10°, the imaging quality naturally decreases, due to the simple construction of the projectors.

Due to the good imaging quality, a proper adjusting of the individual modules towards each other results in homogeneous, seamless superimpositions of the light distributions, so that the overall light distribution, which is a result of the superimposition, can be perceived as an overall homogeneous and color-compensated light distribution. No abrupt brightness differences occur between the individual partial light distributions.

Figure 14D:
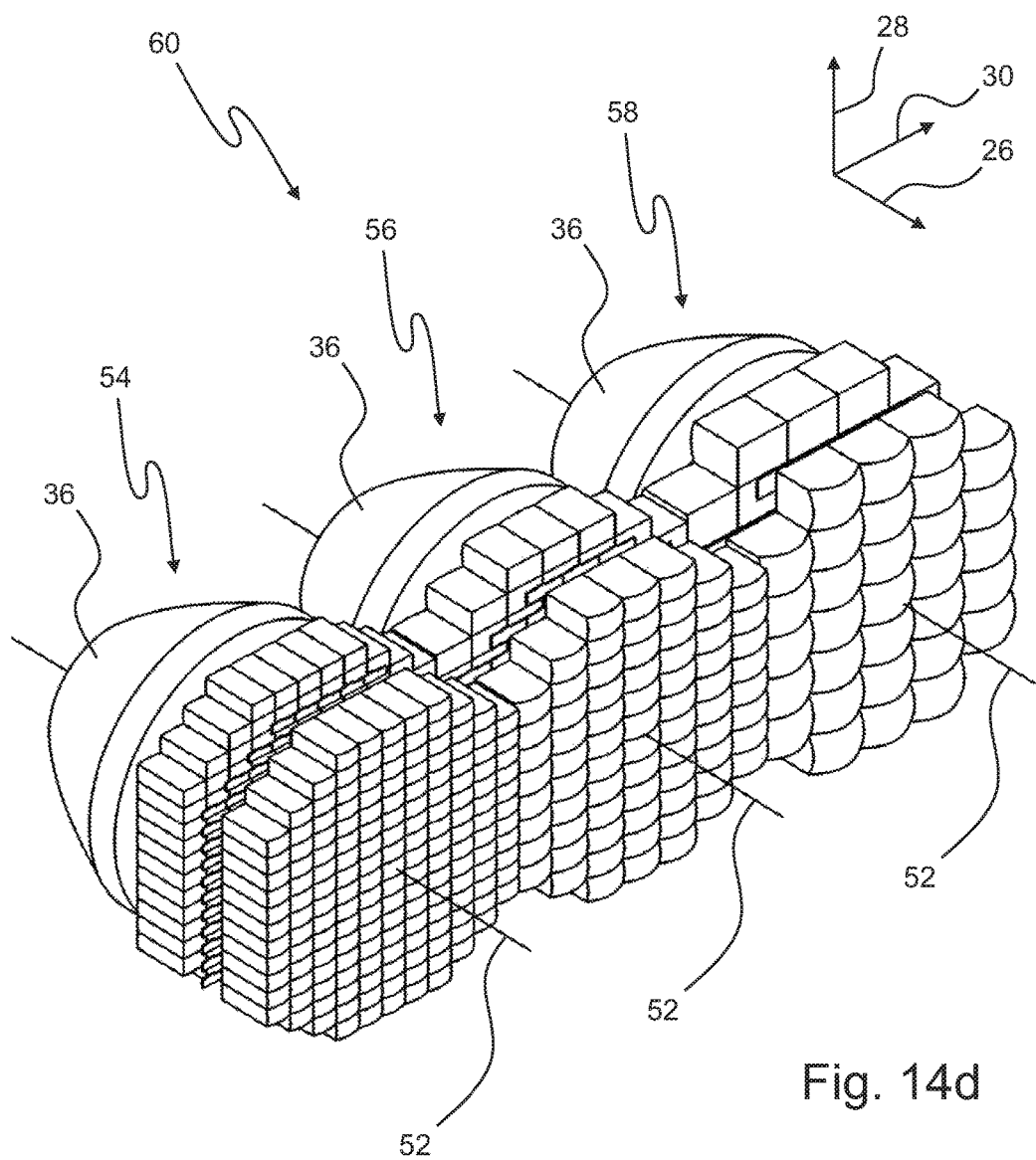

FIG. 14d depicts an ensemble 60 of such a first light module 54, of such a second light module 56 and of such a third light module 58. The three light modules are preferably used together in one headlight, in order to e.g. generate a low-beam light distribution that is made up of a hot spot portion, a wide spread portion and an extra wide spread portion.

In a preferred embodiment, the motor vehicle headlight is characterized in that it comprises micro projectors, whose widths are different and whose heights are different.

A superimposition of several partial light distributions, which are generated by micro projectors with varying cross-sections, can also be implemented with one single light module type.

Figure 15A:
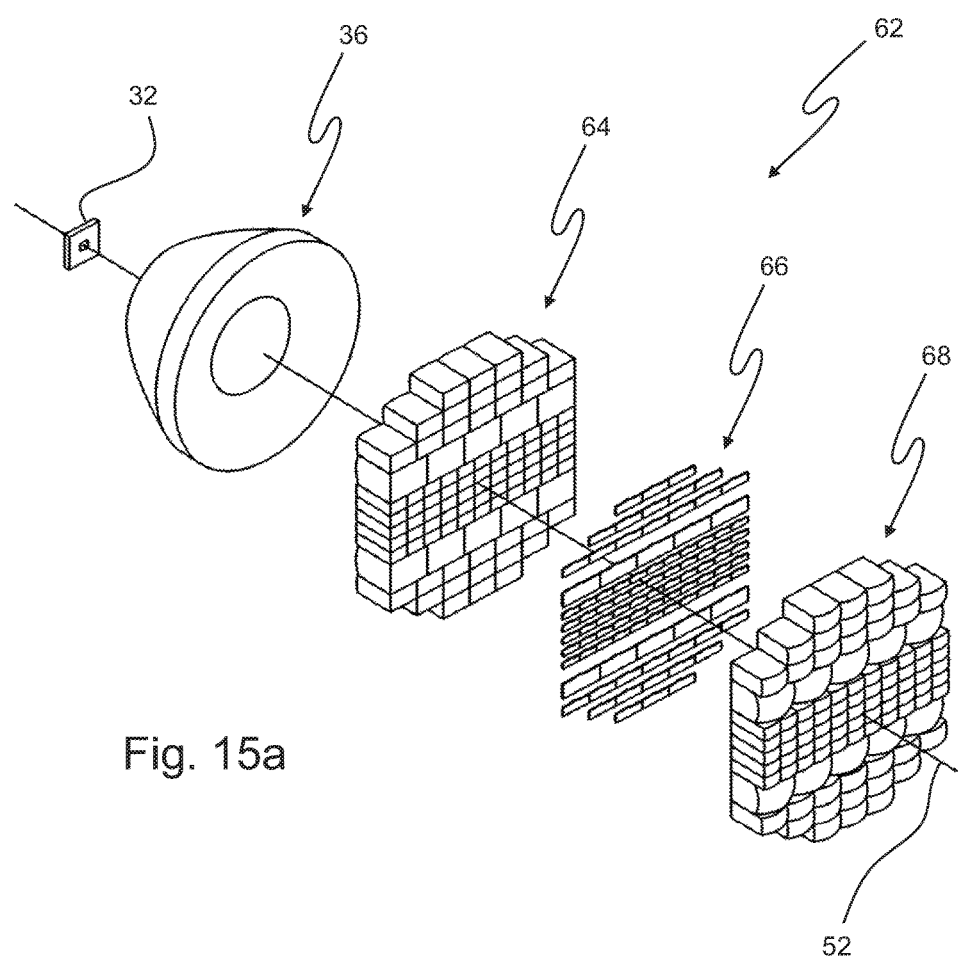
FIGS. 15a and 15b show a hybrid light module which comprises micro projectors, whose widths are different and whose heights are different.
Figure 15B:
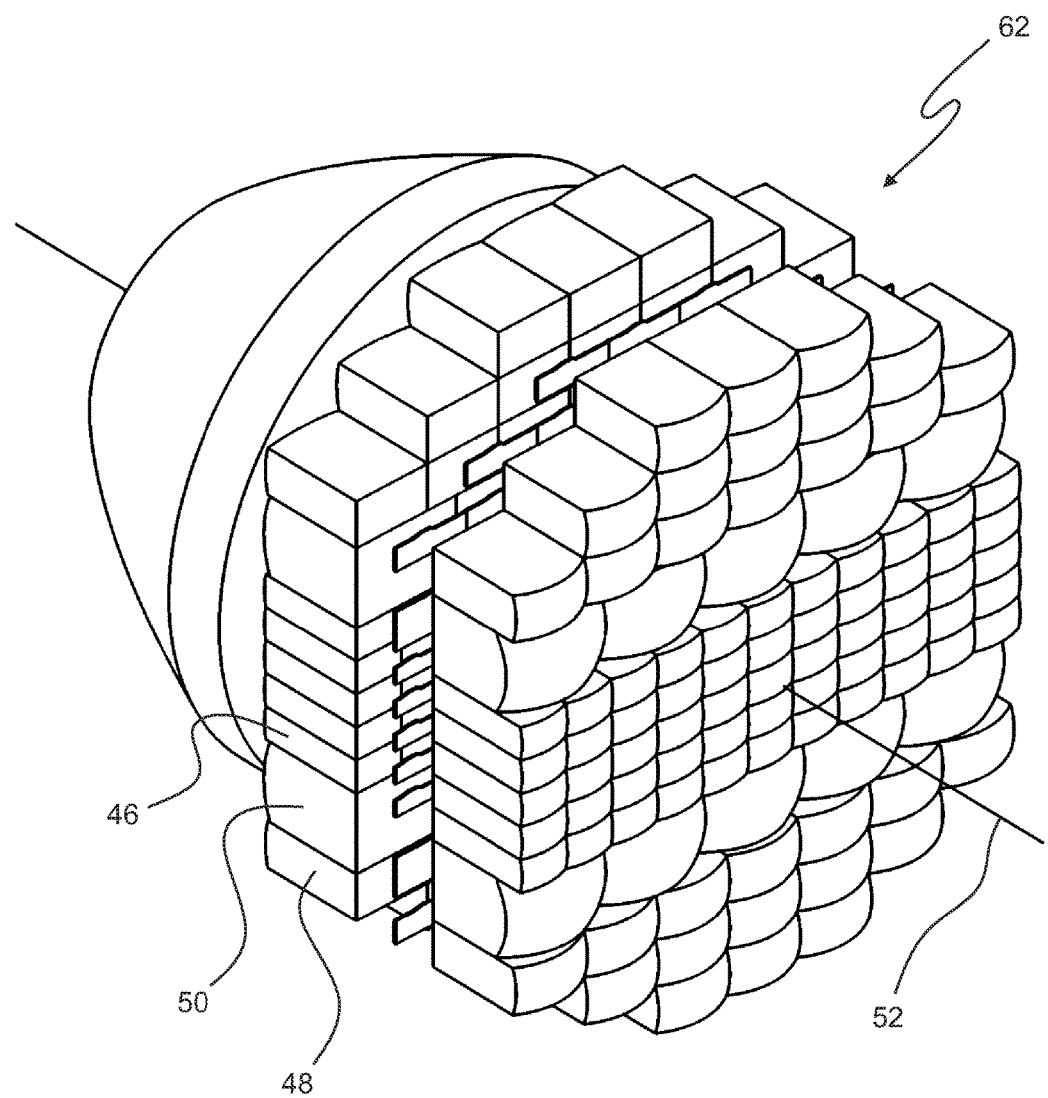

FIGS. 15a and 15b depict a light module 62 that comprises micro projectors, whose widths are different and whose heights are different. FIG. 15a hereby shows a depiction, which is pulled apart along the optical axis 52, in which light source 32, primary optics 36, the array of input lenses 64, the array of apertures 66 and the array of output lenses 68 can clearly be detected as they are separated from each other. FIG. 15b depicts light module 62 in an operational assembled state. FIG. 15b shows very clearly that micro projectors 46, 48, 50 of varying cross-sections are provided.

FIGS. 15a and 15b depict examples of how the different types of micro projectors 46, 48, 50, which are distributed in rows or columns or according to another pattern, can be combined into a hybrid micro projector array, wherein the term "hybrid" in this application describes the use of micro projectors with varying cross-sections in connection with one common collimating primary optics 36 and light source 32. By using hybrid light modules 62, it is possible to compile various combinations of hot spot, wide spread and extra wide spread micro projectors. It is thus possible to highlight the varying portions of the overall light distribution to different degrees, so that e.g. an overall light distribution with a distinct maximum or with a larger or smaller horizontal and/or vertical aperture angle are produced. Different row or column combinations, even mixed rows are possible. The micro projectors can be arranged in any desired way towards each other (preferably parallel or almost parallel), so that the complete cross-section of the light beam of the light source, which is collimated by the primary optics, can be used.

By use of the values for the heights and widths of the individual micro projectors, which can be separately stipulated during their construction, it is possible to control the portions of the thereof resulting partial light distribution in their superimposition of the individual partial light distributions, so that a desired course of the light intensity in horizontal and in vertical direction can be achieved in the superimposition.

In a preferred embodiment, several of such hybrid light modules are used in one headlight, wherein each hybrid light module generates a complete, scaled light distribution (scaled: differently sized, but with the same proportions). It is thus possible to generate the required light distribution comprising e.g. two to three equal hybrid light modules by use of a suitable power supply of the light sources.

For the hybrid light modules 62, micro projectors of differently sized cross-sections are combined in one single micro projector module 62, so that one light source 32 or one collimator 36 can be assigned to a hot spot, a wide spread as well as an extra wide spread micro projector array. The overall light distribution of such a module 62 thus covers the entire required angle range. The overall light distribution is being defined by the "mixture ratio" of the micro projector cross-section types and can be finely or continuously dimmed via the power supply of the light source. Its contrast ratios are hereby ideally maintained.

In practice, the collimating primary optics 36 features a residual divergence. The light of the light source, which emits from the primary optics, is thus not fully parallel, but features an opening angle of a few degrees. The cross-section of the collimated or focused luminous flux features varying local light intensities. This has the effect that, depending on where the micro projector is located within the collimating light bundle, it projects the same geometric cut-off line image onto the roadway, but illuminates it differently. Each projection possibly features a different light focus or may even be only partially illuminated. In accordance with the superposition principle, the overall light distribution is a result of the sum of the individual images. It is the objective that by the superimposition of the individual images, dispersion-related color effects cancel themselves out in their entirety.

During production, the proposed hybrid light module can lead to a simplification and to higher unit numbers. Only one module type would be necessary, instead of having to develop different modules for hot spot, wide spread and extra wide spread partial light distributions and having to manufacture these in smaller numbers.

The dimensions of the active optics of a hybrid light module range e.g. at 25 mm×25 mm (height×width) and at a construction depth of approx. 30 mm. If it is supposed that three modules would be required to generate a low-beam light distribution, this would result in e.g. 25 mm×75 mm×30 mm (height×width×depth). Compared with the dimensions of a conventional projection module of approx. 75 mm×75 mm×120 mm (height×width×depth), this results in a volume reduction in the magnitude of a factor $1/12$.

The potential of this technology is herein by far not exhausted. It is possible to scale such hybrid light modules in a dual linear manner, which corresponds to a further volume scaling factor of $1/8$. In this way, volume scalings of $1/(12\times8)=1/96$ with reference to a conventional projector system would be possible. Of course, other factors like heat, cooling, LED light flow, control electronics and manufacturability will also affect the scaling or counteract it. Still, the present invention opens new possibilities for a miniaturization, for light technological innovation and quality improvement, for the implementation of modern design ideas for new courses in the perception as well as for the cost reduction and value enhancement of future headlight generations.

The invention opens the way for an impressive reduction of construction space (reduction of up to ¹⁄₁₀₀ are possible) and generates an extremely homogeneous overall light distribution with a distinct cut-off line. The modularity and excellent manufacturability and robust operation lead to the advantage of expecting low production costs.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A motor vehicle headlight featuring at least one light module, wherein each of said at least one light module includes one light source, one primary optics that focuses the light from said one light source as well as a plurality of micro projectors, wherein each of said plurality of micro projectors comprises one respective input lens, an output lens and an aperture that is arranged between the input lens and the output lens, wherein the input lens, the aperture and the output lens define a width (b) that extends parallel to a horizontal direction and a height (h) that extends parallel to a vertical direction, wherein the primary optics, the input lens, the aperture and the output lens of one respective micro projector are arranged in such a way, that the light from the light source that emits from the primary optics illuminates the input lens, and the light from the light source that emits from the input lens illuminates the output lens, and wherein the motor vehicle headlight comprises micro projectors of said plurality of micro projectors, whose widths (b) are different from the width (b) of at least one other of said plurality of micro projectors and whose heights (h) are different from the height (h) of at least one other of said plurality of micro projectors.

2. The motor vehicle headlight as set forth in claim 1, wherein focal points of the input lens of at least one of the micro projectors are located within one expansion direction of the light of the light source that is issuing from the input lens behind the aperture of the at least one micro projector.

3. The motor vehicle headlight as set forth in claim 1, wherein each of said output lens includes a light output surface that defines a curvature, and said light output surfaces of the output lenses of at least two of the micro projectors feature the same curvature.

4. The motor vehicle headlight as set forth in claim 1, wherein the motor vehicle headlight comprises first micro projectors that feature a first width and a first height, second micro projectors that feature a second width and a second height, and third micro projectors that feature a third width and a third height.

5. The motor vehicle headlight as set forth in claim 4, wherein it comprises several light modules.

6. The motor vehicle headlight as set forth in claim 5, wherein a first light module of the several light modules only comprises first micro projectors, whose widths are equal and whose heights are equal, and that a second light module of the several light modules only comprises second micro projectors, whose widths are equal and whose heights are equal, wherein the widths of the first micro projectors are different from the widths of the second micro projectors and wherein the heights of the first micro projectors are different from the heights of the second micro projectors.

7. The motor vehicle headlight as set forth in claim 1, wherein at least one of said plurality of micro projectors, has a width that is different from the width (b) of at least one other of said plurality of said micro projectors and a height that is different from the height (h) of at least one other of said plurality of said micro projectors.

8. The motor vehicle headlight as set forth in claim 7, wherein a sum of the widths of adjacently arranged micro projectors of one light module is less than 30 mm and that a sum of the heights of micro projectors of one light module that are arranged on top of each other is less than 30 mm.

9. The motor vehicle headlight as set forth in claim 1, wherein the micro projectors define depths and the widths of the micro projectors are less than 6 mm, the heights of the micro projectors are less than 4 mm and the depths of each respective lens of the micro projectors is less than 6 mm.

10. The motor vehicle headlight as set forth in claim 1, wherein the motor vehicle headlight comprises a plurality of light modules, wherein the light-collecting primary optics of at least two of the light modules bundle the light entering into them to different degrees.

* * * * *